(12) United States Patent
Boatman et al.

(10) Patent No.: US 9,605,786 B2
(45) Date of Patent: Mar. 28, 2017

(54) HIGH PRESSURE FLUID SWIVEL

(71) Applicant: SOFEC, INC., Houston, TX (US)

(72) Inventors: L. Terry Boatman, Spicewood, TX (US); Stephane Roy, Houston, TX (US)

(73) Assignee: SOFEC, Inc., Houston, TX (US)

( * ) Notice: Subject to any disclaimer, the term of this patent is extended or adjusted under 35 U.S.C. 154(b) by 216 days.

(21) Appl. No.: 14/178,106

(22) Filed: Feb. 11, 2014

(65) Prior Publication Data

US 2015/0226358 A1 Aug. 13, 2015

(51) Int. Cl.
*F16L 27/00* (2006.01)
*F16L 39/06* (2006.01)

(52) U.S. Cl.
CPC .................................... *F16L 39/06* (2013.01)

(58) Field of Classification Search
USPC ...................... 285/121.3, 121.5, 272, 95, 351
See application file for complete search history.

(56) References Cited

U.S. PATENT DOCUMENTS

| | | | | |
|---|---|---|---|---|
| 1,523,822 A * | 1/1925 | Marret | ................... | F26B 13/183 285/121.3 |
| 2,586,991 A * | 2/1952 | Postel | ................... | F04B 1/2064 285/190 |
| 2,659,615 A * | 11/1953 | McClain | ................. | F16L 39/06 244/111 |
| 2,849,244 A * | 8/1958 | Sampson | ............... | B23B 31/302 277/500 |
| 3,166,344 A * | 1/1965 | Davis | ...................... | E02F 9/123 285/121.3 |
| 3,175,849 A * | 3/1965 | Allcott | .................... | F16L 39/06 285/121.3 |
| 3,259,403 A * | 7/1966 | Hjalsten | .................... | E21B 6/00 173/73 |
| 4,280,720 A * | 7/1981 | Lomenech | .............. | F16L 39/06 285/121.5 |

(Continued)

OTHER PUBLICATIONS

International Search Report and Written Opinion for International Application No. PCT/US2015/013033, dated Jan. 27, 2015.

*Primary Examiner* — Aaron Dunwoody
(74) *Attorney, Agent, or Firm* — Douglas W. Rommelmann; Andrews Kurth Kenyon LLP (57) ABSTRACT

A fluid swivel that includes a stationary annular structure defining upper and lower annular seal recesses, and a rotatable outer housing operatively connected to the stationary annular structure, the outer housing defining an annular passage that has upper and lower surfaces. Upper and lower seals are positioned between the stationary annular structure and the rotatable outer housing and disposed in the upper and lower seal recesses. An inner housing bore is disposed in the stationary annular structure and arranged to provide fluid of pressure P to the annular passage, the fluid exerting a first force ($Fv_1$) longitudinally inwardly on the outer surface of the outer housing, and a second force ($Fv_2$) longitudinally outwardly on the upper and lower surfaces of the annular passage, the second force ($Fv_2$) having a greater magnitude than the first force ($Fv_1$) so the outer housing deflects outwardly, pushing the upper and lower seals into the upper and lower seal recesses.

6 Claims, 5 Drawing Sheets

(56) References Cited

U.S. PATENT DOCUMENTS

| | | | |
|---|---|---|---|
| 4,555,118 A | 11/1985 | Saliger | |
| 4,602,806 A | 7/1986 | Saliger | |
| 4,662,657 A | 5/1987 | Harvey et al. | |
| 4,669,758 A * | 6/1987 | Feller | F16L 39/06 277/500 |
| 4,819,966 A | 4/1989 | Gibb | |
| 4,925,219 A * | 5/1990 | Pollack | F16L 27/087 277/563 |
| 5,411,298 A | 5/1995 | Pollack | |
| 6,053,787 A | 4/2000 | Erstad et al. | |
| 6,070,917 A * | 6/2000 | Wiebe | F16L 27/087 285/121.5 |
| 6,234,540 B1 | 5/2001 | Drijver | |
| 6,402,202 B1 * | 6/2002 | Colombo | F16L 39/04 285/121.1 |
| 6,450,546 B1 | 9/2002 | Montgomery | |
| 7,556,294 B2 * | 7/2009 | Schutt | F16L 27/087 285/121.3 |
| 7,614,663 B2 * | 11/2009 | Brass | B60H 1/00571 285/147.1 |
| 2002/0017785 A1 * | 2/2002 | Omiya | F16L 39/04 285/121.3 |
| 2013/0099475 A1 * | 4/2013 | Dalton | F16L 27/0816 285/121.3 |

* cited by examiner

HIGH PRESSURE FLUID SWIVEL

BACKGROUND OF THE INVENTION

1. Field of the Invention

This invention relates in general to swivel equipment for transferring fluids. In particular, the invention relates to a fluid swivel joint for a swivel stack assembly adapted for transferring fluids between tankers, storage vessels and the like and one or more conduits beneath the ocean surface. The fluid of the swivel may be product such as hydrocarbons to be transferred from the seabed to a vessel or may be water or gas to be transferred from the vessel to the seabed for well stimulation.

Still more particularly, the invention relates to a sealing arrangement for a fluid swivel joint which uses the mechanical design of the joint with the pressure of the fluid flowing through the joint to substantially prevent seal glands, and extrusion gaps in which dynamic seals are placed, from enlarging as a function of high pressure of the fluid commonly encountered on offshore loading terminals for oil and gas tankers.

2. Description of the Prior Art

The offshore search for oil and gas has greatly expanded in recent years and progressed into deep rough waters such as the North Sea. To facilitate production of oil and gas from remotely located offshore fields, complex mooring systems for offshore loading terminals, which serve as centralized production sites for the entire field, have been developed. Flexible fluid lines, called risers, extend from a subsea location to the mooring site to permit the transfer of fluids between a moored vessel and a subsea location. For example, certain fluid lines may be used to convey oil and gas into the floating vessel while other fluid lines may be used to inject liquids or gases back from the vessel into subsea wells for purpose of control, well stimulation, or storage.

Floating vessels can be moored to a single point mooring system, which permits the vessel to weathervane and rotate 360° about a single mooring point. To permit the vessel to rotate and move freely without causing twisting or entanglement of the various risers to which the vessel is attached, it is necessary to provide a swivel mechanism to connect the fluid lines to the mooring site. Furthermore, since a plurality of risers are involved, it is necessary that swivels be stacked in order to have the capability of accommodating multiple fluid lines or risers.

Separate swivel assemblies are stacked on top of each other with a swivel base fixed to a stationary frame anchored to the sea floor.

Prior high pressure fluid swivels have provided an inner housing and an outer housing which is rotatively supported on the inner housing by a bearing so that the outer housing is free to rotate about the inner housing. An annular conduit chamber or passage is formed between the two housings when the two housings are placed in registration with each other. An inlet from the inner housing communicates with the chamber, and an outlet in the outer housing communicates with the chamber. Upper and lower dynamic seals in the form of face seals or radial seals are placed in grooves or gaps between co-axially opposed or radially opposed surfaces of the inner and outer housings to prevent fluid from leaking past the two facing surfaces while the high pressure fluid is present in the chamber.

When high pressure is present in the inlet and passes through the annular passage and out the outlet, the pressure in the annular passage acts to separate the inner housing and the outer housing from each other. In other words, the inner housing is forced to contract radially inward as a consequence of the force generated by the fluid pressure acting on an effective area between the two dynamic seals; the outer housing is forced to expand radially outward by the force of the fluid pressure acting on an effective area between the upper and lower dynamic seals. Separation occurs between the facing surfaces as a result of high fluid pressure in the annular passage. High pressure as used herein is meant to be at the level of 2,000 psi and above.

As the pressure of flowing fluid increases, the separation between the facing surfaces in which the seals are placed increases. Such separation can be large enough, due to the high fluid pressures, so as to prevent leak-free operation of the swivel at the high pressures by seal extrusion failure.

Swivel component deformation has been the subject of much effort by prior developers. The prior art has considered the idea of adding more material to the swivel components so that deformation as a function of pressure—especially high pressure in the 5,000 to 10,000 psi range—will resist deflection. With high pressures, however, the swivel components, i.e., the inner and outer housings, become so large and heavy that they are disadvantageous from weight, cost, handling, and size standpoints, and without necessarily achieving the desired extrusion gap control.

The prior art discloses swivels that use exterior pressure sources to apply balancing or "barrier" fluid pressure at the dynamic seal interface. Examples of such "active" pressure compensation for dynamic seal gap control are shown in U.S. Pat. No. 4,602,806 to Saliger; U.S. Pat. No. 4,669,758 to Feller et al., U.S. Pat. No. 5,411,298 to Pollack; U.S. Pat. No. 6,053,787 to Erstad et al., and U.S. Pat. No. 4,662,657 to Harvey et al. All of these patents disclose separate anti-extrusion rings above and below the annular fluid passage in combination with active pressure compensation.

U.S. Pat. No. 4,555,118 to Salinger discloses, at FIG. 4, a free floating anti-extrusion ring placed above and below an annular passage between inner and outer rings. The free floating anti-extrusion ring is initially displaced (i.e., at zero pressure) from the inner joint ring by a small seal extrusion gap. In operation, the internal pressure of the pressurized fluid in the annular passage is transmitted to the outer side of the anti-extrusion ring such that the pressure differential across the seal presses the anti-extrusion ring against the outer surface of the inner ring. In other words, the seal extrusion gap width varies as a function of internal pressure. Metal to metal contact of the anti-extrusion ring with the annular surface of the inner ring can cause friction and scoring problems during operation.

Figure 2:
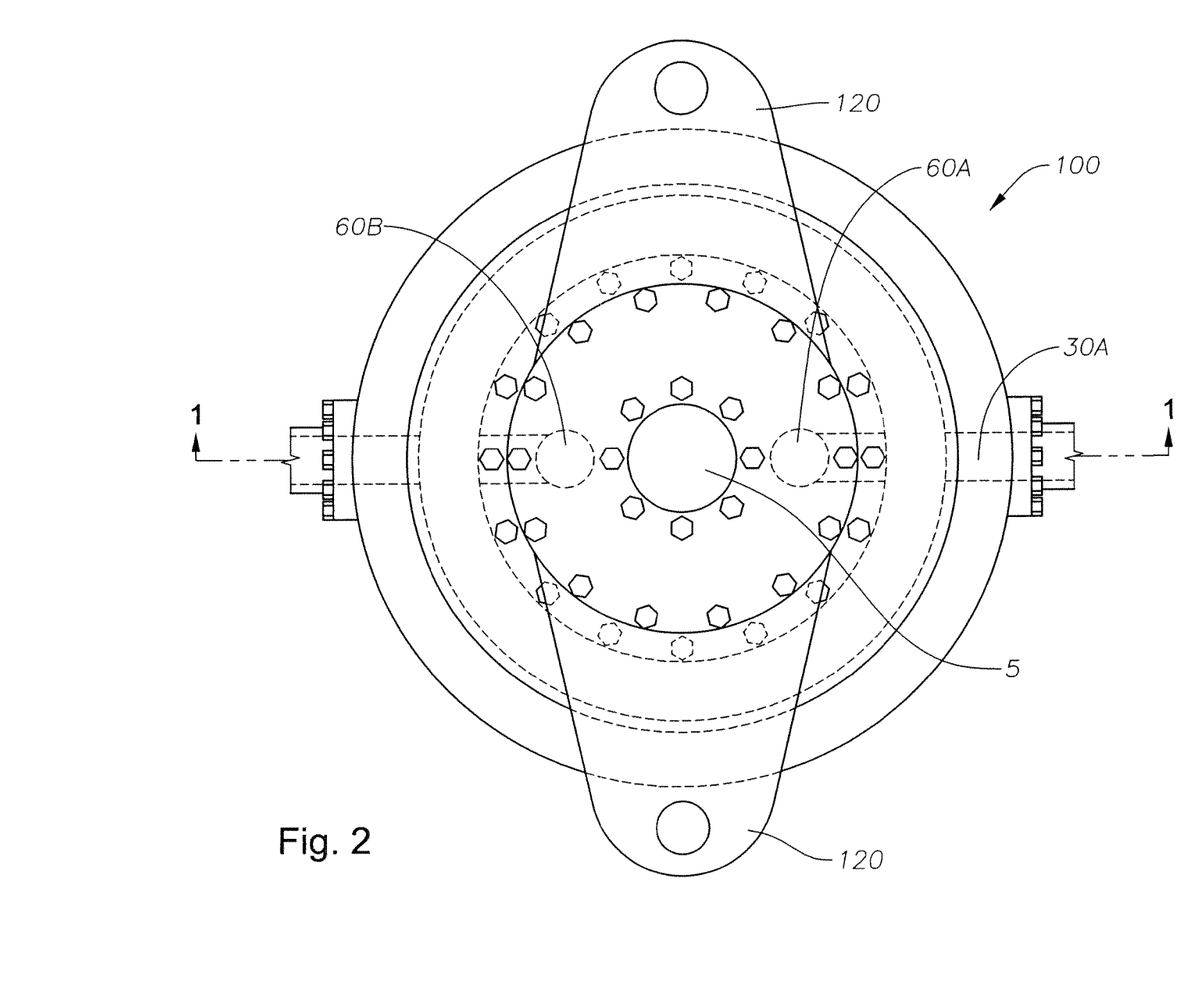
FIG. 2 is a top view of the swivel stack assembly of FIG. 1 with section line 1-1 indicating the cross section view of the top swivel of the assembly of FIG. 1.
Figure 3:
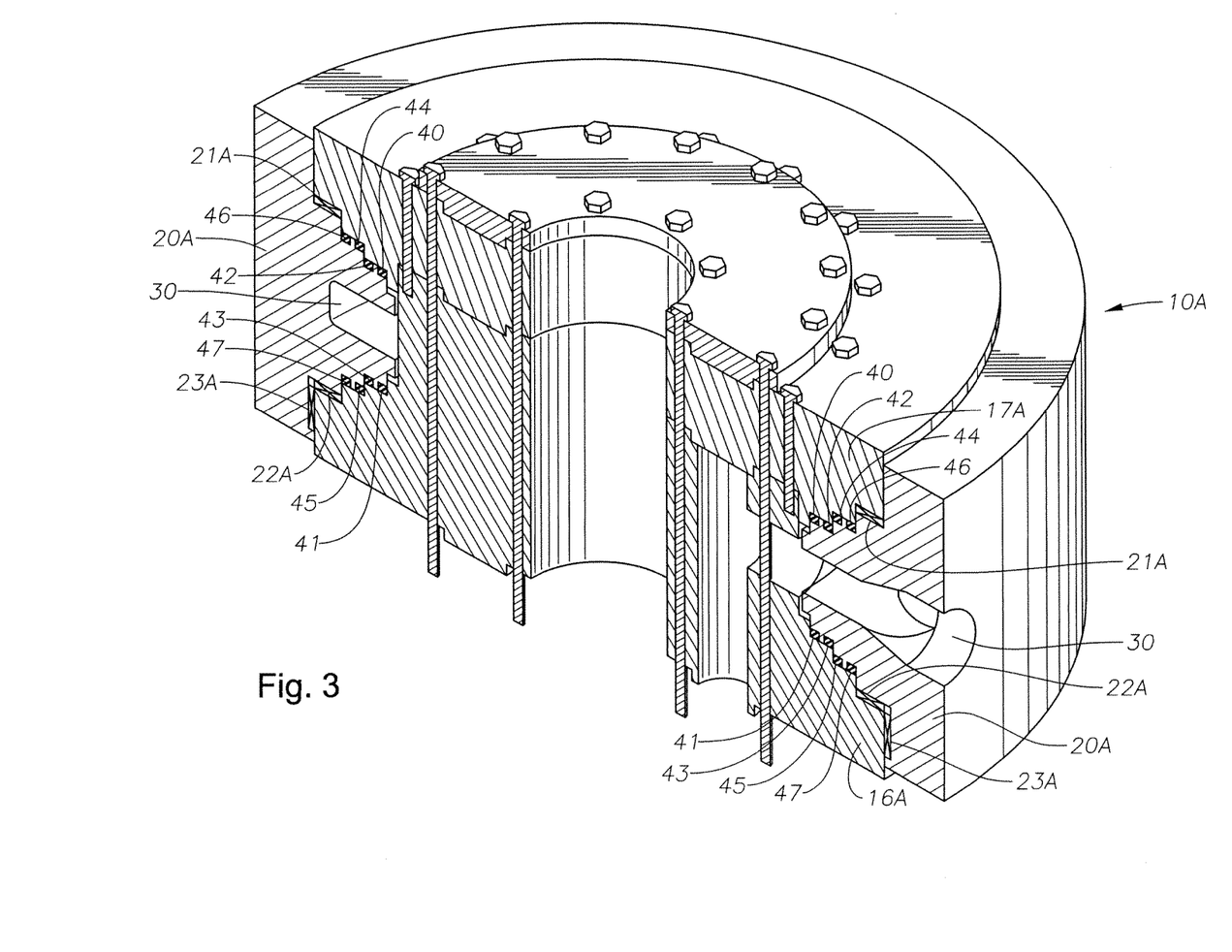
FIG. 3 is an enlarged sectional view of a swivel according to the invention.
Figure 4:
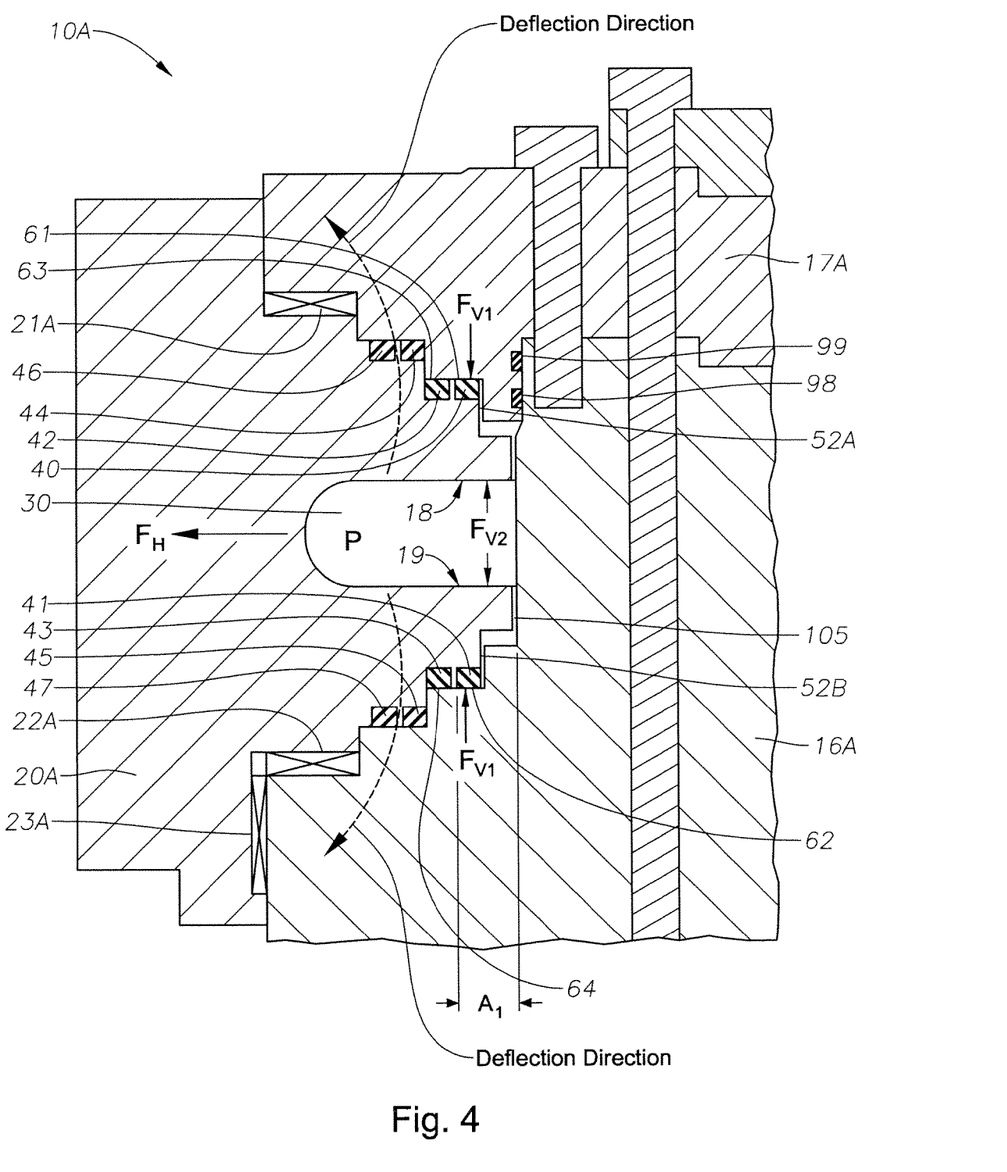
FIG. 4 is an enlarged sectional view showing stair stepped dynamic face seals between inner and outer housings with an annular groove in the outer housing, with arrows showing forces on the swivel parts caused by pressure in the swivel.

U.S. Pat. No. 4,819,966 to Gibb, at FIGS. 2, 3, and 4, shows an annular ring having an annular groove which registers with the inlet of an inner housing. An annular chamber is formed outwardly in the annular ring such that upper and lower lips are created in the annular ring that face the exterior surface of the inner housing. The lips carry dynamic seals and are forced into sealing engagement about the cylindrical surface of the inner housing above and below the inlet when pressure is in the chamber. A constant radial seal gap is maintained as a function of pressure by proper shaping of the chamber and the ring and the lip. A lubricating system may also be provided for injecting a controlled fluid.

U.S. Pat. No. 6,450,546 to Montgomery and Roy shows a sealed fluid joint for a fluid swivel in which a pressure balanced middle housing ring is mounted between an inner housing and outer housing ring. Pressure balance is achieved by providing an inner annulus chamber or cavity between the inner housing and middle housing ring and an outer annulus chamber or cavity between the middle and outer housing ring. Holes or passages through the middle housing ring fluidly connect the inner and outer chambers. Dynamic seals are placed in seal glands between the inner housing and middle housing ring. Static seals are placed in seal glands between the middle and outer housing rings. The arrangement transfers component deformation due to product fluid pressure from the dynamic seal interface to the static seal interface by exposing fluid product pressure to a smaller effective area at the dynamic seals on the inner side of the middle housing ring than an effective area at the static seals on the outer side of the middle housing ring. The counter forces generated by the product fluid pressure over two different effective areas on the middle housing ring deforms the middle housing ring radially in a predetermined direction and amount as a function of increasing pressure. Control of radial deformation of the middle housing ring is passive, because it depends on a geometrical arrangement of dynamic and static seals on both sides of the middle housing ring and is proportional to the product fluid pressure.

3. Identification of Objects of the Invention

A primary object of the invention is to provide a fluid swivel arrangement that is capable of flowing high pressure product through it while minimizing product leaking past dynamic seal grooves formed between inner and outer housings.

Another object of the invention is to provide a fluid swivel arrangement for a predetermined high pressure rating, path diameter, and arrangement and shape of the components that minimizes the swivel outside diameter, height, and weight.

Another object of the invention is to provide shapes and arrangements of inner and outer housings with seals between them that minimize relative internal deflections so as to assume proper function and long life of the seals.

Another object of the invention is to provide a fluid swivel arrangement with inner and outer housings arranged so that internal areas subjected to high fluid pressure are minimized, thereby allowing the parts to be reduced in size and weight.

Another object of the invention is to provide dynamic upper and lower seal recesses in the outer housing with face seals placed therein where the seal recesses are arranged concentrically outward from the axial center line of the fluid swivel, with the shape of an annular passage in the outer housing compensating for the tendency of clearances behind the seals to open wider axially as high pressure acts inside the swivel.

Another object of the invention is to match the bending stiffness of the inner housing with the bending stiffness of the outer housing such that elastic matching occurs with the inner and outer housings axially deflecting about the same amount in the same direction when high pressure fluid is carried by the swivel, so that the inner and outer housings effectively move together with increasing pressure and the axial clearance between the parts remains almost the same.

Another object of the invention is to provide upper and lower dynamic seals where the upper dynamic seals are characterized by a slightly larger diameter than the opposing lower dynamic seals, thereby providing a positive downward force to prevent the outer housing from floating upwardly, thereby preventing excessive vertical force of the seals against the surfaces of the outer housing.

SUMMARY OF THE INVENTION

The objects identified above, as well as other advantages and features of the invention, are incorporated in a sealed fluid joint for a rotatable fluid swivel having inner and outer housings with a fluid pressure carrying annular passage in the annular outer housing that faces upper and lower annular seal recesses, with face seals disposed therein which seal against surfaces of the inner housing. The pressurized internal surfaces in the annular passage are designed and arranged with respect to the pressurized outer surface areas of the outer housing defined by the upper and lower dynamic seals so that the outer housing deflects outwardly with increasing pressure to compensate for axially outward deflection of the inner housing.

The rotatable fluid swivel is further characterized by an inner housing bore in the inner housing that communicates with the annular passage in the annular outer housing. The inner housing bore has a diameter $D_{in}$, while the annular passage is characterized by an internal height and a width.

The internal height of the annular passage is sized to be from 50% to 60% of the internal diameter of the inner housing bore. The width of the annular passage is sized to be about twice the internal height of the annular passage. So sized and arranged, the height of the radial pressure area, bounded by the upper and lower dynamic seals on the outer housing, minimizes the radial pressure force thereby reducing the diameter and weight of the outer housing, while also reducing the compressive load and stresses in the inner housing.

BRIEF DESCRIPTION OF THE DRAWINGS

The objects, advantages, and features of the invention will become more apparent by reference to the drawings which are appended hereto, wherein like reference numbers indicate like parts, and wherein an illustrative embodiment of the invention is shown, of which.

DESCRIPTION OF THE INVENTION

The aspects, features, and advantages of the invention mentioned above are described in more detail by reference to the drawings wherein like reference numerals represent like elements. The following table provides a list of reference numerals used throughout the specification and the features that they represent:

| Reference Numeral | Feature | Figures where Reference Numeral Appears |
|---|---|---|
| 5 | Longitudinal axis | 1 |
| 10A | Upper swivel | 1, 3, 4, 5 |
| 10B | Lower swivel | 1 |
| 16A | Upper swivel inner housing | 1, 3, 4, 5 |
| 16B | Lower swivel inner housing | 1 |
| 17A | Upper swivel seal plate | 1, 3, 4, 5 |
| 17B | Lower swivel seal plate | 1 |
| 18 | Upper ring portion | 4 |
| 18A | Threaded bolts | 1 |
| 19 | Lower ring portion | 4 |
| 20A | Upper swivel outer housing | 1, 3, 4, 5 |
| 20B | Lower swivel outer housing | 1 |
| 21A | Upper swivel upper bearing | 1, 3, 4 |
| 21B | Lower swivel upper bearing | 1 |
| 22A | Upper swivel lower bearing | 1, 3, 4 |
| 22B | Lower swivel lower bearing | 1 |
| 23A | Upper swivel radial bearing | 1, 3, 4 |
| 23B | Lower swivel radial bearing | 1 |
| 26A | Upper inner housing bore | 1 |
| 26B | Lower inner housing bore | 1 |
| 30 | Annular passsage | 1, 3, 4 |
| 30A | Radial flow outlet | 2 |
| 40 | Upper dynamic seal | 3, 4, 5 |
| 41 | Lower dynamic seal | 3, 4, 5 |
| 42 | Backup upper dynamic seal | 3, 4, 5 |
| 43 | Backup lower dynamic seal | 3, 4, 5 |
| 44 | Upper secondary dynamic seal | 3, 4, 5 |
| 45 | Lower secondary dynamic seal | 3, 4, 5 |
| 46 | Backup secondary upper dynamic seal | 3, 4, 5 |
| 47 | Backup secondary lower dynamic seal | 3, 4, 5 |
| 52 | Swivel connectors | 1 |
| 52A | Upper shoulder | 4, 5 |
| 52B | Lower shoulder | 4, 5 |
| 54 | Base housing | 1 |
| 56 | Fixed spools | 1 |
| 58A | Upper swivel base inlet | 1 |
| 58B | Lower swivel base inlet | 1 |
| 60A | Upper spool | 1, 2 |
| 60B | Lower Spool | 1, 2 |
| 61 | First upper annular seal recess | 4 |
| 62 | First lower annular seal recess | 4 |
| 63 | Second upper annular seal recess | 4 |
| 64 | Second lower annular seal recess | 4 |
| 70 | Bolts | 1 |
| 98 | Primary static seal | 4 |
| 99 | Secondary static seal | 4 |
| 100 | Swivel Base | 1 |
| 105 | Space | 4 |
| 120 | Pick-up arms | 2 |
| 200 | Swivel stack | 1 |
| $A_1$ | Lateral component of the circumferential sealed area of the outer housing | 4 |
| $D_P$ | Internal diameter of upper spool | 1 |
| $F_H$ | Horizontal force | 4 |
| $F_{v1}$ | Inward vertical force | 4 |
| $F_{v2}$ | Outward vertical force | 4 |
| $H_{eff}$ | Effective height | 5 |
| P | Pressure in annular groove | 4, 5 |

Figure 1:
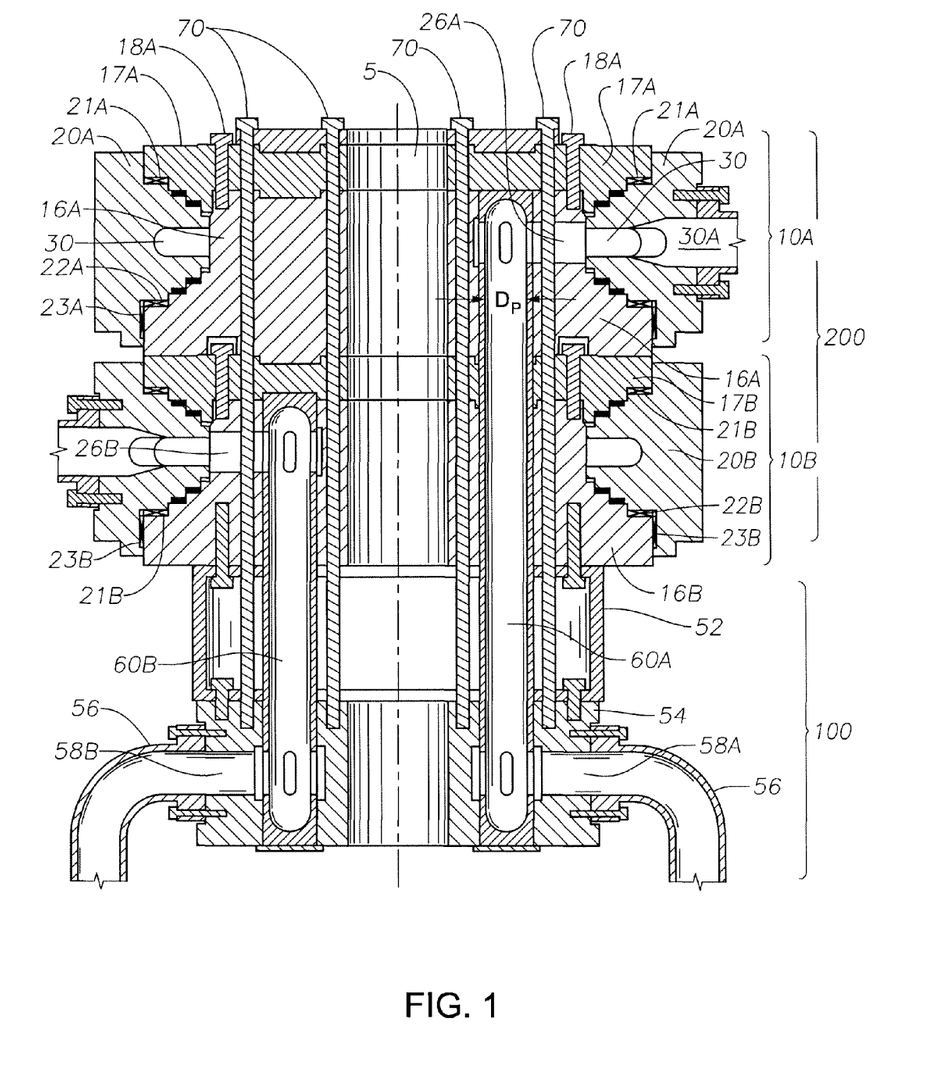
FIG. 1 is a cross section of an illustrative swivel stack assembly with two swivels, each according to the invention, stacked on a swivel base with one inlet of the base fluidly coupled to an outlet of one swivel and a second inlet of the base fluidly coupled to an outlet of a second swivel.

The invention is for a novel high pressure swivel where two of the novel swivels are illustrated in FIG. 1 stacked on top of each other. Two swivels, including upper swivel 10A and lower swivel 10B of swivel stack 200 are shown stacked on top of a fixed swivel base 100. Two swivels are shown for illustrative purposes in FIG. 1, but a single swivel could be provided or more inner housing bases may be provided to accommodate several swivels. As shown in FIG. 1, an upper swivel inner housing 16A, and a lower swivel inner housing 16B are secured by bolts 70 extending from the top of upper swivel 10A through lower swivel 10B, through swivel connector 52 and into base housing 54.

The swivel base 100 is fixed to a substantially geostationary point (not shown) of an offshore mooring terminal. Fixed spools 56, arranged and designed to carry high pressure fluids, enter upper and lower swivel base inlets 58A, 58B of base housing 54. Of course other spools can be provided about the circumference of the base housing 54 to provide fluid communication to other swivels in a stack. An upper spool 60A provides fluid communication between base inlet 58A and upper inner housing inlet 26A of upper swivel 10A. Lower spool 60B provides fluid communication between base inlet 58B and lower inner housing inlet 26B of lower swivel 10B. Spools 60A, 60B are spaced about a longitudinal axis 5 of the stack of swivels.

Upper swivel 10A is constructed with an upper swivel inner housing 16A having an upper swivel seal plate 17A attached to its top by means of threaded bolts 18A. Upper swivel outer housing 20A is rotatively carried on inner housing components 16A, 17A by means of upper swivel upper and lower bearings 21A, 22A and upper swivel radial bearing 23A.

As illustrated in FIG. 1, the lower swivel 10B may be constructed similarly to upper swivel 10A, with the two swivel assemblies bolted together. Lower swivel 10B may be constructed much like upper swivel 10A with lower swivel upper and lower bearings 21B and 22B, and lower swivel radial bearing 23B, providing rotational support of the lower swivel outer housing 20B to the lower swivel inner housing 16B and a lower swivel seal plate 17B. As mentioned above, upper swivel 10A and lower swivel 10B are coupled together, and to the base housing 54, by threaded bolts 70. Although much of the following disclosure references upper swivel 10A and its parts, it is to be understood that the features and principles discussed apply equally to the lower swivel 10B. In addition, a swivel stack according to the present invention may have additional swivels, each sharing features and characteristics in common with those discussed herein.

In the upper swivel 10A, a radial flow outlet 30A in the upper swivel outer housing 20A is radially aligned with an annular passage 30, which extends circumferentially about the upper swivel outer housing 20A. When upper swivel outer housing 20A turns about upper swivel inner housing members 16A/17A, annular passage 30 is always in fluid communication with the upper inner housing inlet 26A, which fluidly connects to spool 60A and base inlet 58A.

FIG. 2 is a top view of the swivel stack of an embodiment of the present invention. Spools 60A, 60B positioned 180° degrees from each other. A single radial flow outlet 30A is illustrated for fluid communication with spool 60A, but multiple radial outlet passages can be provided about the outer housing. Pick-up arms 120 may be mounted to the top of the swivel stack assembly.

FIG. 3 is a perspective view of the upper swivel 10A illustrating the upper swivel inner housing 16A and upper swivel seal plate 17A in registration with the upper swivel outer housing 20A and rotatively supported thereto by bearings 21A, and 22A, as well as lower radial bearing 23A. An upper radial bearing (not shown) can be provided corresponding to bearing 23A. Dynamic seal pairs 40, 42; 41, 43; 44, 46; 45, 47 provide sealing of the inner and outer housing in response to high pressure fluid in inner housing bore 26A and annular passage 30.

FIG. 4 shows an enlarged partial cross section of the upper swivel 10A, including upper swivel inner housing components 16A and 17A, and upper swivel outer housing 20A rotatively supported by upper swivel upper and lower bearings 21A, 22A, and upper swivel radial bearing 23A. Static seals 98, 99 are positioned between inner housing 16A and seal plate 17A to prevent high pressure fluid in annular passage 30 from passing therebetween. Components 16A and 17A are static; they are bolted together and move together as one unit. A first set of upper and lower annular dynamic face seals 40, 41 are placed in first upper and lower annular seal recesses 61, 62. A backup secondary set of upper and lower annular dynamic face seals 42, 43 are placed in second upper and lower annular seal recesses 63, 64, which are of greater diameter than the first upper and lower annular seal recesses 61, 62.

FIG. 4 further illustrates the forces on the upper swivel outer housing 20A caused by high fluid pressure in annular passage 30, as well as the space 105 between upper swivel inner components 16A, 17A and upper swivel outer housing 20A. FIG. 4 exaggerates space 105 to illustrate that high pressure acts behind dynamic seals 40 and 41, including over upper and lower shoulders 52A and 52B, to force dynamic seal 40 into face seal recess 61 and to force dynamic seal 41 into face seal recess 62. In other words, an inward vertical force $F_{v1}$ is applied behind dynamic seals 40 and 41 toward the upper swivel outer housing 20A by virtue of the fluid pressure. The total inward force $F_{v1}$ is equal to the fluid pressure P times the circumferential sealed area of the outer housing, the lateral component of which is identified as $A_1$ in FIG. 4.

The annular passage 30 is shaped so as to cause upper and lower ring portions 18, 19, which face opposite to the dynamic seals 40, 41, to deflect outward and spread apart under the force of pressure P in the annular passage 30. See the arrows labeled "DEFLECTION DIRECTION" of FIG. 4. These deflections partially compensate for any detrimental deflections of the upper swivel seal plate 17A above and the upper swivel inner housing 16A below.

The outward deflections of upper and lower ring portions 18, 19 are caused by pressure P acting on the surfaces of annular passage 30. The circumferential area of the surfaces of the groove on which the pressure P acts, or circumferential groove area, is designed to be greater than the circumferential seal area discussed above. The outward vertical force $F_{v2}$, which is generated by pressure P, acts to deflect the upper and lower ring portions 18, 19 in opposition to inward force $F_{v1}$. The force $F_{v2}$ is greater than $F_{v1}$. The net force $F_{v2}$ - $F_{v1}$ deflects the upper ring portion 18 outward and upward and the lower ring portion 19 outward and downward. As a result, the clearances of the seal recesses 61, 63 and 62, 64 remain substantially constant with pressure increasing to very high levels.

A horizontal force $F_H$ causes upper swivel outer housing 20A to deflect outwardly but has little effect on the clearances of the seal recesses 61, 63 and 62, 64.

Figure 5:
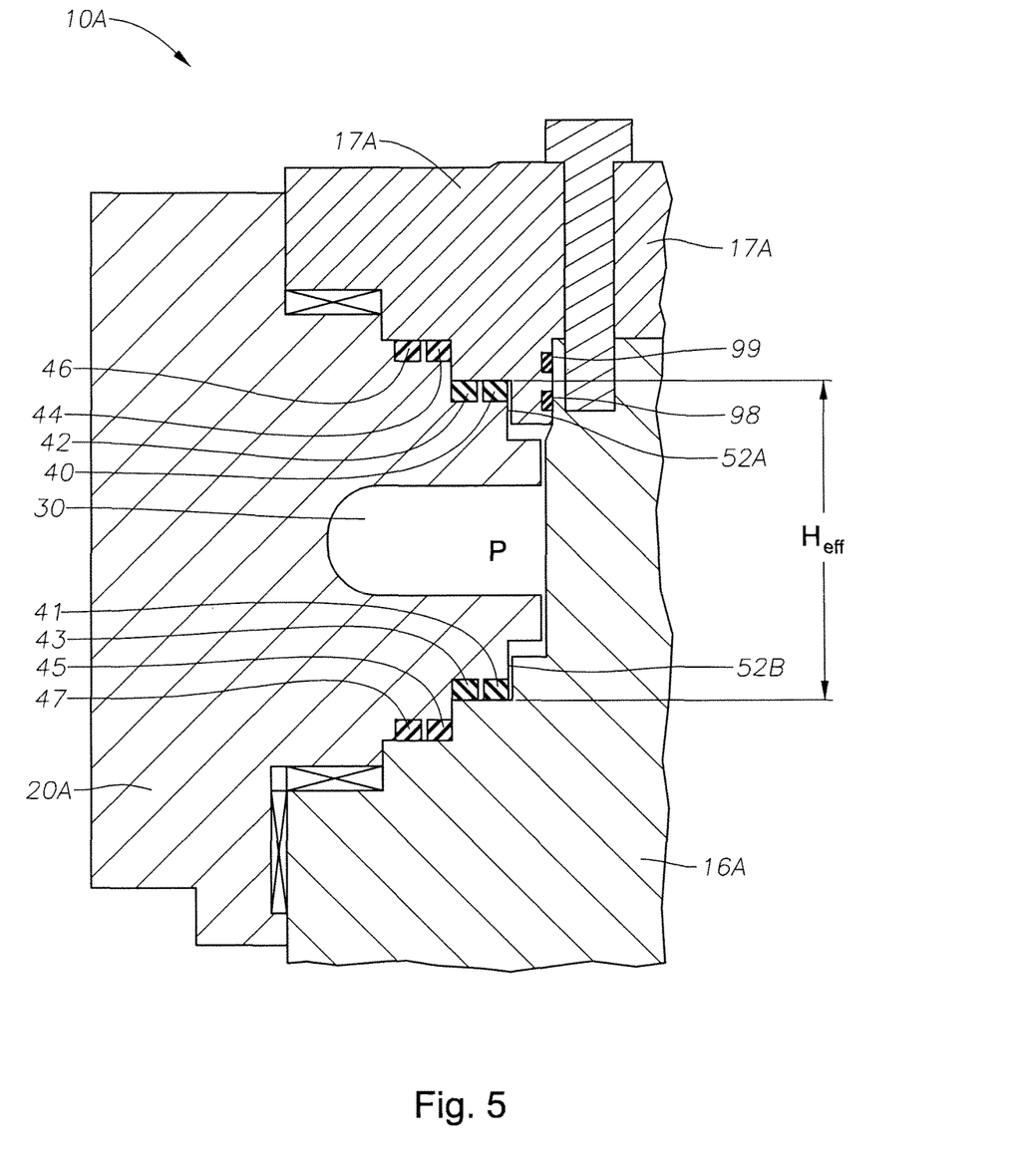
FIG. 5 is another diagrammatic illustration of FIG. 4 showing effective pressure height area in the swivel according to the invention.

FIG. 5 is the same cross section of a portion of a swivel, but illustrates the shortened radial internal pressure height, or effective height $H_{eff}$, on which fluid pressure in the swivel is acting. This tends to force upper swivel outer housing 20A outwardly from the upper swivel inner housing members 16A, 17A. The effective height $H_{eff}$ of the pressure area on which pressure P is acting is the height acting around the groove of the outer housing and upper and lower shoulders 52A and 52B. The area may be reduced by the placement of seals 40, 41 in a stair-step arrangement, bringing them as close together as practical. A reduction in the pressure area results in a reduction of the compressive load and stresses in the inner housing. Further, the reduced effective height $H_{eff}$ reduces the radial force applied to the upper swivel outer housing 20A so that its diameter and weight can be reduced, resulting in a lighter, smaller swivel.

Additional Features

The invention embodied in the swivel illustrated in FIGS. 1-5 is characterized by additional features, including:

(1) The dynamic seals discussed above may include as primary seals an upper seal 40, a lower seal 41, a backup upper seal 42, and a backup lower seal 43 to seal between upper swivel inner housing components 16A, 17A and outer housing 20A. See FIGS. 4 and 5. A secondary seal system, including an upper secondary seal 44, a lower secondary seal 45, a backup secondary upper seal 46, and a backup secondary lower seal 47 may also be provided.

(2) The static seals of FIGS. 4 and 5 may include a primary static seal 98 and a secondary static seal 99.

Separate oil barrier systems may be provided on the primary dynamic seals 40, 42 and 41, 43 and on the secondary dynamic seals 44, 46, and 45, 47.

(3) The upper dynamic seals 40, 42 and 44, 46, that radially surround the inner housing components 16A, 17A, may be of a slightly larger diameter than the corresponding opposing lower dynamic seals 41, 43 and 45, 46. Such larger diameter of the upper dynamic seals as compared to the lower dynamic seals produces a positive downward force that minimizes upper swivel outer housing 20A from "floating" upward and excessively forcing the seals vertically.

(4) The radial groove annular passage 30 in the upper swivel outer housing 20A is wide and of short height, as illustrated in FIG. 4, with the height being about 50% to 60% of the internal diameter $D_p$ of the inner housing inlet (26A). As described above, the dynamic seals 40, 42; 41, 43; 44, 46; 45, 47 are preferably placed as close together as practical in a stair step arrangement. Such geometries contribute to the reduction of pressure height in the area acting on the upper swivel outer housing 20A. (See, e.g., effective height $H_{eff}$ in FIG. 5). With a predetermined internal pressure rating, that pressure acts on a smaller pressure area, resulting in a smaller radial force. As a consequence, the diameter and weight of the outer housing is reduced, compared to prior swivels of the same pressure rating. The shorter effective pressure height $H_{eff}$ area also reduces the compressive load and stresses in the upper swivel inner housing components 16A and 17A.

What is claimed is:
1. A sealed fluid swivel comprising:
an inner housing assembly positioned coaxially about a longitudinal axis;
an outer housing positioned coaxially about the inner housing assembly and arranged and designed to rotate relative to the inner housing assembly about the longitudinal axis, the outer housing including:
a radially inward-facing annular surface defining an innermost diameter of the outer housing;
an radially inward-facing annular passage having a radial width and an axial height;
a radial flow passage having an internal diameter and communicating with the annular passage;
upper and lower annular seal recesses, the upper annular seal recess is above the annular passage and the lower annular seal recess is below the annular passage;
an upper seal disposed in the upper annular seal recess and a lower seal disposed in the lower annular seal recess, the upper and lower seals for sealing between the outer housing and annular, axially-facing surfaces of the inner housing assembly;
an inner housing bore disposed in the inner housing assembly and communicating with the annular passage, the inner housing bore arranged to carry fluid having a fluid pressure to the annular passage, the fluid allowed to fill a small space between the inner housing assem- bly and outer housing from the radially inward-facing annular surface of the outer housing to the upper and lower seals;

wherein the axial height of the annular passage is smaller than the internal diameter of the radial flow passage, the width being about twice the axial height of the annular passage, thereby allowing the axial distance between the upper and lower seals to be minimized to reduce the effective pressure height ($H_{eff}$) of the outer housing on which the pressurized fluid outwardly acts.

2. A fluid swivel comprising:

a stationary inner housing assembly;

a rotatable outer housing operatively connected to the stationary inner housing assembly and defining upper and lower annular seal recesses, the outer housing having an annular passage that has upper and lower surfaces and a radially inward-facing annular surface defining an innermost diameter of the outer housing;

upper and lower seals positioned between the stationary inner housing assembly and the rotatable outer housing and disposed in the upper and lower annular seal recesses; and an inner housing bore disposed in the stationary inner housing assembly and arranged to provide fluid having a fluid pressure (P) to the annular passage, the fluid allowed to fill a small space between the inner housing assembly and the outer housing from the radially inward-facing annular surface to the upper and lower seals, the fluid exerting a first axial force ($Fv_1$) on an outer upper surface of the outer housing, and a second axial force ($Fv_2$) on the upper surface of the annular passage, the second force ($Fv_2$) having a greater magnitude than the first force ($Fv_1$) so that the outer housing deflects axially upward.

3. The fluid swivel of claim 2, wherein the fluid exerts a third axial force ($Fv_1$) on an outer lower surface of the outer housing, and a fourth axial force ($Fv_2$) on the lower surface of the annular passage, the fourth axial force ($Fv_2$) having a greater magnitude than the third axial force ($Fv_1$) so that the outer housing deflects axially downward.

4. The fluid swivel of claim 3, wherein the third axial force is equal to the first axial force but in the opposite direction and the fourth axial force is equal to the second axial force but in the opposite direction.

5. The fluid swivel of claim 2, wherein the outer housing and the stationary inner housing assembly are separated by at least two axial thrust bearings and at least one radial bearing.

6. The fluid swivel of claim 2, further comprising backup seals, secondary seals, and backup secondary seals, positioned between the outer housing and the stationary inner housing assembly.

* * * * *